(12) United States Patent
Kou

(10) Patent No.: US 11,713,154 B2
(45) Date of Patent: Aug. 1, 2023

(54) REEL LABELING

(71) Applicant: ACCU-ASSEMBLY INCORPORATED, Andover, MA (US)

(72) Inventor: Yuen-Foo Michael Kou, Andover, MA (US)

(73) Assignee: Accu-Assembly Incorporated, Andover, MA (US)

( * ) Notice: Subject to any disclaimer, the term of this patent is extended or adjusted under 35 U.S.C. 154(b) by 0 days.

(21) Appl. No.: 17/623,832

(22) PCT Filed: Aug. 13, 2021

(86) PCT No.: PCT/US2021/045892
§ 371 (c)(1),
(2) Date: Dec. 29, 2021

(87) PCT Pub. No.: WO2022/036185
PCT Pub. Date: Feb. 17, 2022

(65) Prior Publication Data
US 2022/0315267 A1 Oct. 6, 2022

Related U.S. Application Data

(60) Provisional application No. 63/065,276, filed on Aug. 13, 2020.

(51) Int. Cl.
*B32B 41/00* (2006.01)
*B65C 9/40* (2006.01)
(Continued)

(52) U.S. Cl.
CPC ............. *B65C 9/40* (2013.01); *B41J 3/4075* (2013.01); *B65C 1/02* (2013.01); *B65C 9/02* (2013.01);
(Continued)

(58) Field of Classification Search
CPC .... B65C 9/40; B65C 1/02; B65C 9/02; B65C 9/26; B65C 2009/408; B41J 3/4075; B65G 61/00
(Continued)

(56) References Cited

U.S. PATENT DOCUMENTS 6,036,812 A 3/2000 Williams et al.
6,078,845 A 6/2000 Friedman
(Continued)

FOREIGN PATENT DOCUMENTS

EP 1504881 A1 2/2005
KR 102285727 B1 8/2021
WO 2006115630 A1 11/2006

OTHER PUBLICATIONS

International Search Report and Written Opinion in related International Application No. PCT/US2021/045892, dated Nov. 26, 2021, 29 pages.
(Continued)

*Primary Examiner* — Michael N Orlando
*Assistant Examiner* — Joshel Rivera
(74) *Attorney, Agent, or Firm* — Fish & Richardson P.C.

(57) ABSTRACT

A system for labeling a reel of electrical components includes an automated robotic manipulator movable between a reel grasping position and a reel releasing position; a sensor positioned to scan a label on a reel as the reel is moved by manipulator from the reel grasping position to the reel releasing position, to gather initial reel information; a label generator configured to generate a new label with information based at least in part on the initial reel information; and a label actuator positioned to affix the new label to the reel as the reel remains held by the manipulator. The sensor may be a barcode scanner. The label generator may be a label printer. The label actuator may be a pneumatic
(Continued)

actuator. The system may also have a stack of reels to be labeled. Also included is output receptacle to receive the reel after the new label is affixed.

22 Claims, 12 Drawing Sheets

(51) Int. Cl.
  *B41J 3/407* (2006.01)
  *B65C 1/02* (2006.01)
  *B65C 9/02* (2006.01)
  *B65C 9/26* (2006.01)
  *B65G 61/00* (2006.01)

(52) U.S. Cl.
  CPC ............... *B65C 9/26* (2013.01); *B65G 61/00* (2013.01); *B65C 2009/408* (2013.01)

(58) Field of Classification Search
  USPC ................ 156/60, 64, 350, 351, 378, 379
  See application file for complete search history.

(56) References Cited

U.S. PATENT DOCUMENTS

| | | |
|---|---|---|
| 6,419,782 B1 | 7/2002 | Johnson et al. |
| 6,675,056 B1 | 1/2004 | Black, Jr. et al. |
| 6,805,294 B2 | 10/2004 | Itoh |
| 8,463,426 B1 | 6/2013 | Rogers et al. |
| 9,718,280 B1 | 8/2017 | Beicht et al. |
| 10,005,582 B2 | 6/2018 | Wolff |
| 10,494,130 B1 | 12/2019 | Bigbee, Jr. et al. |
| 10,654,608 B2 | 5/2020 | Lizari Illarramendi et al. |
| 2016/0052659 A1* | 2/2016 | Bowers ............ B65C 1/021 156/64 |
| 2016/0378088 A1 | 12/2016 | Son |
| 2018/0130011 A1 | 5/2018 | Jacobsson |

OTHER PUBLICATIONS

[No Author Listed] [online], "Modi Goods in Scanner," May 2, 2018, retrieved on Mar. 1, 2023, retrieved from URL <https://www.youtube.com/watch?v=vPGIRqCo1Xs>, 2 pages [Video Submission].

* cited by examiner

REEL LABELING

TECHNICAL FIELD

This invention relates to the labeling of reels that contain electrical components, and more particularly to devices and methods used to generate and affix new labels on previously-labeled reels.

BACKGROUND

A reel is an arrangement of electronic components, suitable for providing such components to a placement machine for subsequent placement upon a destination circuit board, often in the form of a spool of tape with discrete components carried along the tape. If a facility has multiple identical reels of a particular part or from a particular manufacturer, the facility may not be able to distinguish each reel, even if the reels contain original labeling. Labeling or relabeling a reel in these circumstances can thus solve this issue. Example types of reel label information include customer part number, supplier part number, component quantity, lot code, and date code. Reel label information may also include environmental conditions that a reel has been exposed to.

SUMMARY

Certain aspects of the invention can be implemented as a method of labeling a reel of electrical components. The method includes grasping a reel having an exposed label indicating information about electrical components carried on the reel; moving the grasped reel across a label sensor to gather the indicated electrical component information; generating a new label indicating information determined as a function of gathered information; and, while the reel remains grasped, affixing the new label to the reel.

This, and other aspects, can include one or more of the following features.

In some embodiments, prior to affixing the new label, the reel is positioned such that the new label will be affixed in a predetermined location on the reel.

In some embodiments, positioning the reel is rotating the reel.

In some embodiments, the new label is affixed over the exposed label.

In some embodiments, the exposed label is on an underside of the reel, and the grasped reel is moved over the label sensor.

In some embodiments, the reel remains grasped until after the new label is affixed.

In some embodiments, after affixing the new label, the reel is placed into or onto a reel output receptacle.

In some embodiments, the reel is grasped from a stack of reels.

Certain aspects of the invention can be implemented as a system for labeling a reel of electrical components. The system includes an automated robotic manipulator movable between a reel grasping position and a reel releasing position; a sensor positioned to scan a label on a reel as the reel is moved by the automated robotic manipulator from the reel grasping position to the reel releasing position, to gather initial reel information; a label generator configured to generate a new label with indicating information based at least in part on the initial reel information; and a label actuator positioned to affix the new label to the reel as the reel remains held by the automated robotic manipulator.

This, and other aspects, can include one or more of the following features.

In some embodiments, the sensor is a barcode scanner.

In some embodiments, the label generator is a label printer.

In some embodiments, the label actuator is a pneumatic actuator.

In some embodiments, the new label comprises a unique reel identifier.

In some embodiments, the initial reel information and new label indicating information are carried on bar codes.

In some embodiments, a stack of reels to be labeled is included.

In some embodiments, an output receptacle is included to receive the reel from the automated robotic manipulator after the new label is affixed to the reel.

Various embodiments can provide a particularly efficient means for automatically labeling a set of component reels with facility-specific information useful, for example, in the management of inventory and component tracking.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
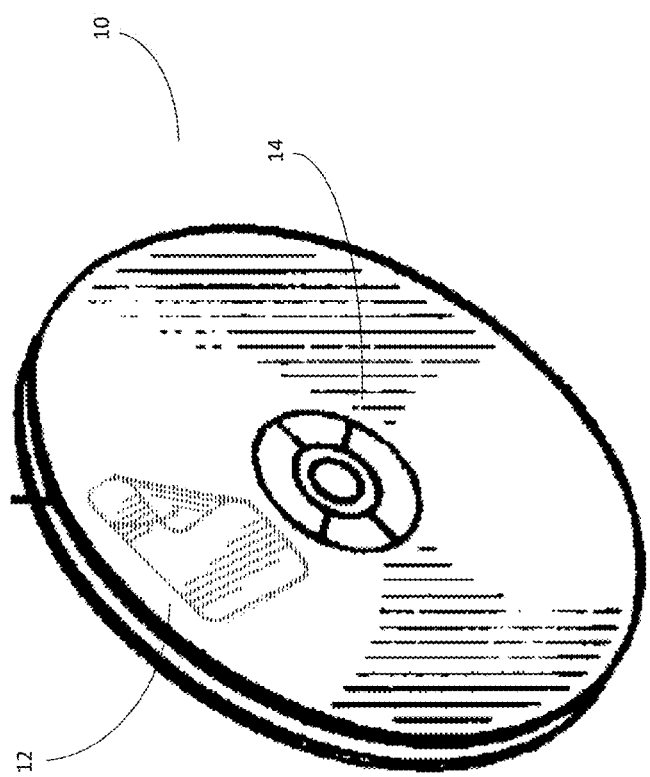
FIG. 1 is an illustration of a reel with a removable label.

FIG. 1 shows a reel 10. A reel 10 is an arrangement of electronic components, suitable for providing such components to a placement machine for subsequent placement upon a destination circuit board. The electrical components are contained as a spool inside the reel's 10 protective outer covering.

The reel 10 shown further includes a removable label 12 affixed to one face of the reel 10. The removable label 12 contains information about electrical components carried on the reel 10. The label 12 may include a unique reel identifier, which allows every reel to be identified and accounted for. The labels on the reels may be a bar code. Various bar code symbologies may be used. The Electronic Industries Association (EIA), for example, has established a standard format for bar coding reel labels, in which the bar code graphic indicates, in order, the customer part number, the supplier part number, and the component quantity. Labels may also include information such as lot code and date code.

The label 12 shown in FIG. 1 is affixed to the reel 10 with an adhesive. But a label can also be imprinted directly on a reel in a number of ways, such as by printing or laser etching.

The reel 10 in FIG. 1 further has a central bore 14 which runs through the reel 10. The central bore 14 allows the reel to be grasped and manipulated. Reel bores can vary in size, number, and placement, due to factors such as the requirements of the placement machine, which places components in the reel 10 upon a circuit board.

Figure 2:
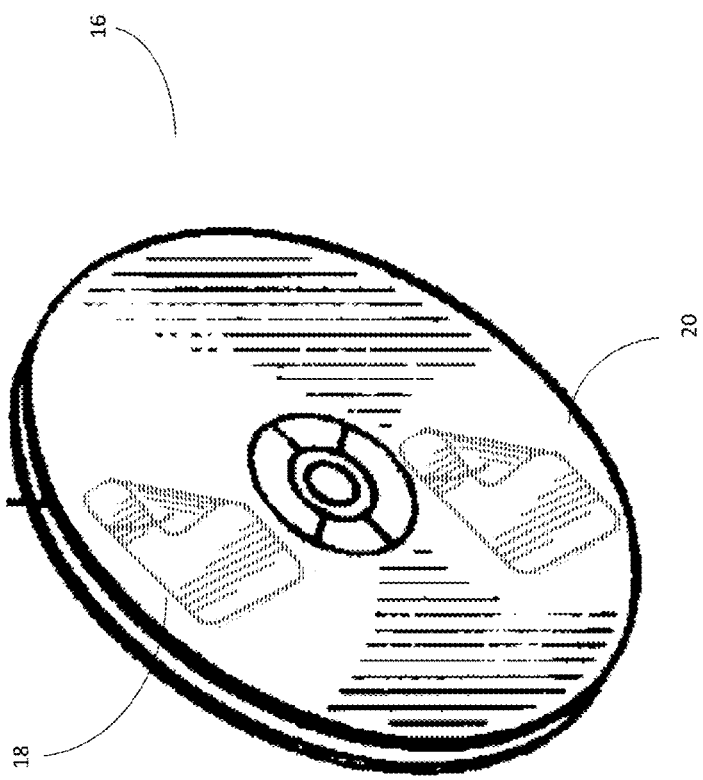
FIG. 2 is an illustration of a reel with a new label affixed separately from the original label.

FIG. 2. shows a reel 16 with a first label 18 and a second label 20. The first label 18 and second label 20 typically contain different information about the components carried on the reel 16. The first label 18 and second label 20 are spaced separately, such that information contained on each label is accessible. To avoid some information being inaccessible, the labels ideally do not overlap. Further, the labels are preferably on the same face of the reel 16 so that both labels' information can be accessed without flipping the reel.

Figure 3:
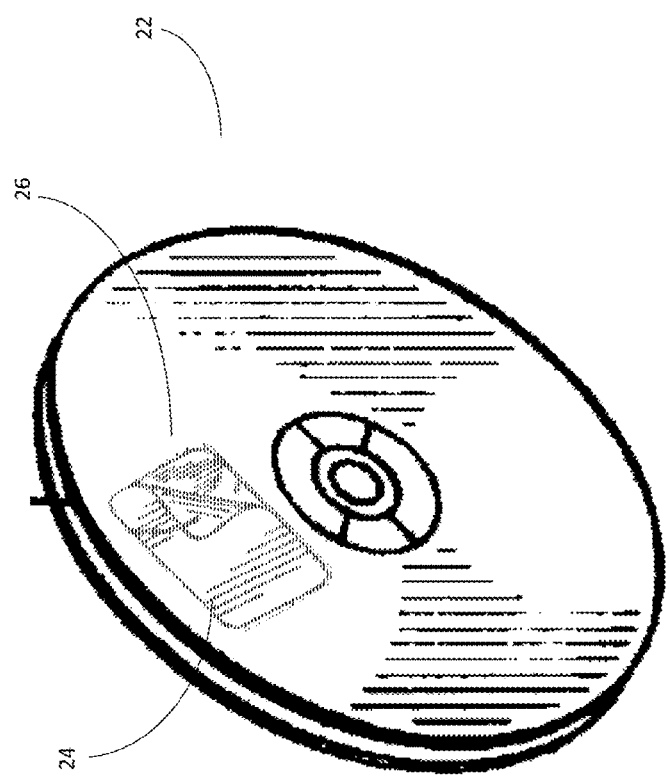
FIG. 3 is an illustration of a reel with a new label affixed over an original label.

FIG. 3. shows a reel 22 with a second label 24 and a first label 26. The first label 26 is covered by the second label 24. Thus, the information contained on the first label 26 is not accessible but the information contained on the second label 24 is accessible. Preferably, the second label 24 substantially covers the first label 26 to limit or prohibit access to the first label 26. The second label 24 shown in FIG. 3 is affixed over the first label 26 using an adhesive.

Figure 4:
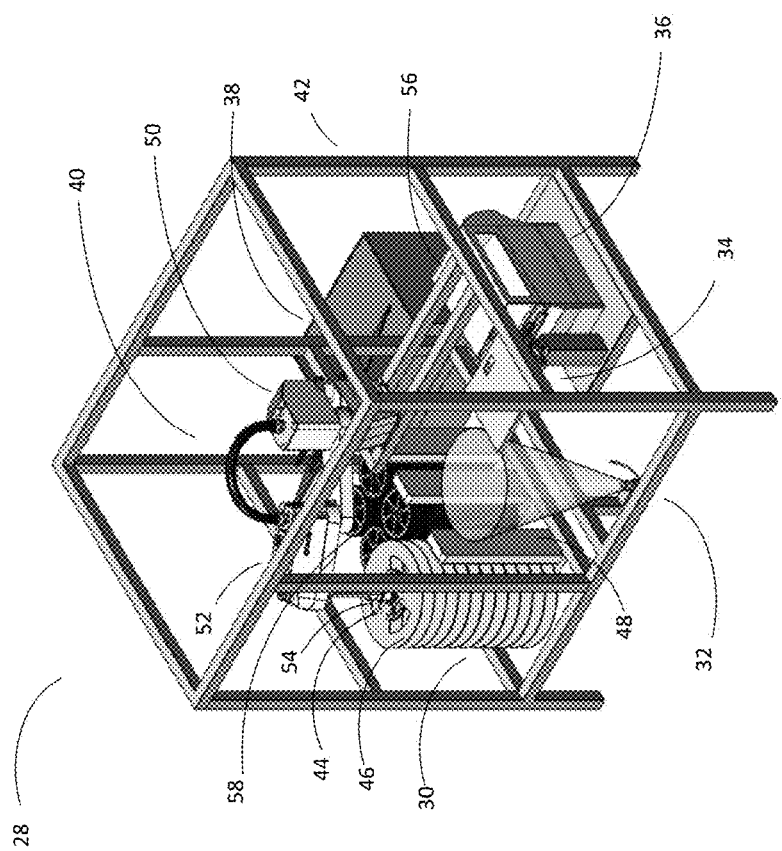
FIG. 4 is an illustration of a device for labeling or relabeling a reel of electrical components.

FIG. 4 shows a device 28 for labeling or relabeling a reel. The device 28 may be implemented into a manufacturing facility's tracking and workflow management system. Many manufacturing facilities employ high levels of automation, and reel inventory is tracked and monitored electronically. Thus, if a facility has multiple identical reels of a particular part or from a particular manufacturer, the facility may not be able to distinguish each reel, even if the reels contain original labeling. Labeling or relabeling a reel in these circumstances can thus solve this issue.

Further, each reel will have a number of components remaining on the reel at any time. And each reel may be removed from a placement machine and placed in a stockroom awaiting further use. A manufacturing facility will thus need to determine how many components remain on a reel when the reel is ultimately placed back on a placement machine. As such, reels are labeled or relabeled to reflect this information.

Labeling or relabeling can also be used to track the environmental conditions of reels. For example, facilities may need to track the length of time a reel has been exposed to a certain temperature, certain humidity, or another condition if that condition can affect the quality or functioning of the components on the reel.

The device 28 of FIG. 4 contains several stations, including a stack 30 of reels, a label sensor 32, a label actuator 34, a label generator 36, and an output receptacle 38. Further included is an automated robotic manipulator 40. The device 28 is also contained in a housing 42. The device 28 may output a reel as shown in FIG. 2 or FIG. 3.

The reels are preferably stacked in a column as shown in FIG. 4. This exposes the central bore 44 of the top reel 46, and the automated robotic manipulator 40 is able to grasp the top reel 46 by the central bore 44. Further, stacking the reels in a column allows the automated robotic manipulator 40 to grasp each reel at the same starting location. This has several benefits, including increasing the device's 28 operating rate and reducing the total space required by the device 28. Stacking further optimizes the device 28 as only one reel is typically exposed. Thus, the automated robotic manipulator 40 is less likely to unintentionally grasp additional reels or the incorrect reel. A single stack 30 of reels is preferred, but multiple stacks may be present depending on factors such as available space and required output. In addition, to increase system speed and accuracy it is preferred that the reels in the stack 30 are all the same size and have the same number and type of central bores 44. To reduce the device's likelihood of operational upset, an inner wall 48 supports and isolates the stack 30 of reels. The stack 30 of reels can alternatively be isolated and supported by a bin.

The automated robotic manipulator 40 shown has body 50, an arm 52, and a work piece 54. The automated robotic manipulator 40 may be a gripper. The work piece 54 shown has fingers able to grasp and release a reel, preferably by grasping the reel through its central bore 44. The work piece 54 may instead include other features such as a vacuum to grasp and release a reel. The automated robotic manipulator body 50 can rotate so the work piece 54 can reach each station. The manipulator arm 52 shown can rotate the work piece 54 and move work piece 54 in various directions such as horizontally and vertically.

The automated robotic manipulator 40 is attached to rails 56 and is powered by a motor 58. The rails 56 allow the manipulator 40 to freely move between the device's 28 stations. The rails 56 are fastened to the housing 42 to maximize the manipulator's 40 stability and range of motion and to minimize utilized space.

The label sensor 32 gathers electrical component information on a grasped reel's label. The label sensor 32 may be a camera or barcode scanner. The label sensor 32 is secured by being fastened to the housing 42. The label sensor 32 is positioned such that the automated robotic manipulator 40 moves a grasped reel above the label sensor 32. This eliminates the need that the manipulator 40 flip or rotate the grasped reel to expose the reel's label to the label sensor 32. This optimizes the system, for example, by decreasing the likelihood that the label sensor 32 fails to gather the label's information and by increasing the rate at which label information can be gathered.

Optimally, the label sensor 32 is able to gather the label's electrical component information nearly instantaneously, as the automated robotic manipulator 40 carries the grasped reel above the label sensor 32. But the automated robotic manipulator 40 may be required to stop above the label sensor 32 so that the sensor 32 can gather the label's electrical component information. Further, the automated robotic manipulator 40 may position the grasped reel above the label sensor 32, such as by rotating, so that the label sensor 32 can gather the electrical component information.

After the label sensor 32 gathers the electrical component information, the information is preferably sent to a database or manufacturing execution system ("MES"). The database or MES determines what information will be contained on the new label as a function of the gathered information. The database or MES sends the information to be included on the new label to the label generator 36. The label generator 36 may be a label printer. The label generator 36 of FIG. 4 is fastened to the housing 42.

The label actuator 34 of FIG. 4 is positioned adjacent to the label generator 36 so that the label actuator 34 can easily receive the generated labels. The label generator 36 and label actuator 34 are further positioned such that a label can be generated and applied as the grasped reel moves from the stack 30 of reels to the output receptacle 38. This is preferred as it optimizes the distance the reel is required to travel and improves the device's speed and accuracy.

In FIG. 4, once the automated robotic manipulator 40 has moved the grasped reel over the label actuator 34, the label actuator 34 applies the generated label to the grasped reel. In FIG. 4, the label actuator 34 is a pneumatic lift. As such, the label actuator 34 lifts the generated label from the point where it received the generated label to the gripped reel as the reel is above the actuator 34. In some embodiments, label verification is employed by one or more additional sensors to ensure that the generated label has been correctly affixed to the reel.

The output receptacle 38 receives the reel after the label actuator 34 has applied the generated label. As such, the output receptacle 38 is positioned adjacent to the label generator 36 to increase the device's speed and accuracy. The output receptacle 38 may be, for example, an output stack. A labeled reel may also be removed manually although this is not preferred as it typically decreases the device's speed.

The housing 42 contains the device's individual components. Further, the device's components can be secured to the housing 42. The housing 42 may additionally have guardrails or panes to isolate the device's internal components from extrinsic interference.

Figure 5:
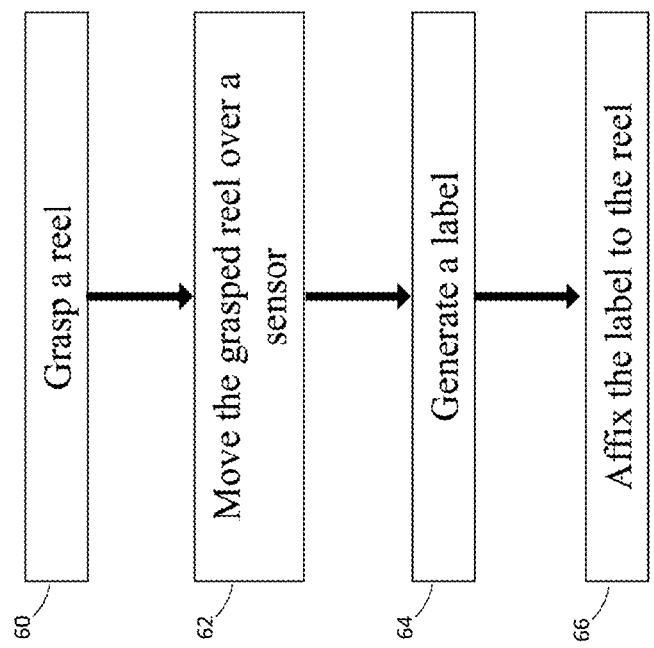
FIG. 5 is a flow diagram of the basic operation of the system of FIG. 4.

FIG. 5 is a block flow diagram of an example method. At block 60, a reel is grasped, and the grasped reel has an exposed label indicating information about electrical components carried on the reel. At block 62, the grasped reel is moved across a sensor to gather the indicated electrical component information. At block 64, a new label is generated indicating information determined as a function of the gathered information. Finally, at block 66, while the reel remains grasped, a new label is affixed to the reel.

Figure 6:
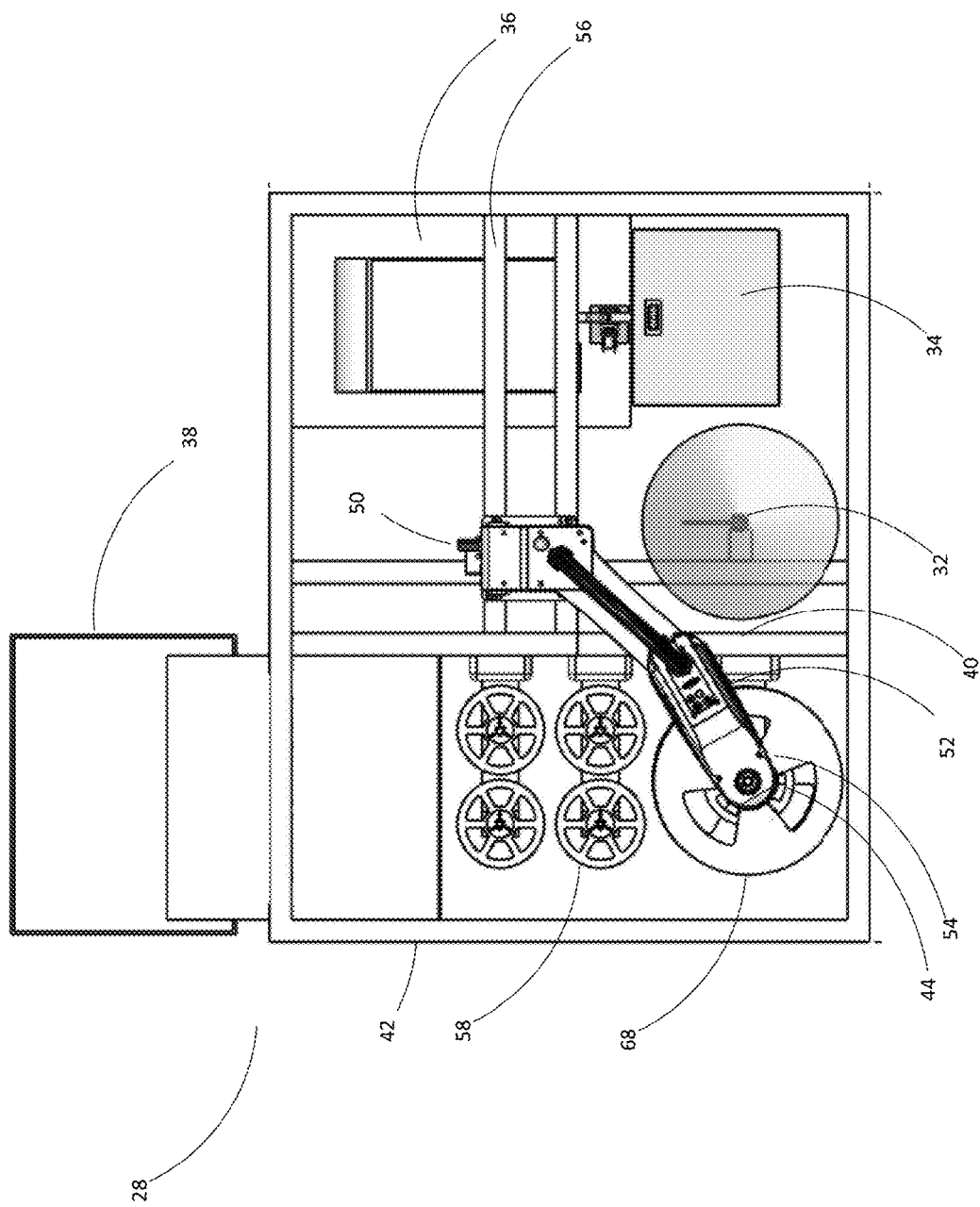
FIG. 6 is an illustration of an automated robotic manipulator grasping a reel.

FIG. 6 shows an overhead view of a device 28 according to the invention. Specifically, FIG. 6 illustrates an automated robotic manipulator 40 grasping a reel 68. The automated robotic manipulator 40 is attached to rails 56 and includes a motor 58, work piece 54, arm 52, and body 50. The rails 56 and motor 58 are fastened to the device's housing 42. The rails 56, motor 58, work piece 54, arm 52, and body 50 allow the manipulator 40 to move freely above the device's stations, i.e. the label sensor 32, the label actuator 34, the label generator 36, and the output receptacle 38. The automated robotic manipulator 40 preferably has a sensor that gathers the location of the reel's central bore 44 and each station. The manipulator 40 also preferably contains a controller that electrically links the manipulator 40 with the device's stations. The controller directs the manipulator such that the manipulator 40 only moves from a station when the station has completed its task.

The automated robotic manipulator work piece 54 of FIG. 6 has at least one finger. In FIG. 6 the finger of a work piece 54 is being inserted through the central bore 44 of a reel 68. Once inserted, the finger securely grasps the reel 68. It is further preferred that the work piece 54 grasps with reel 68 with sufficient pressure so that the reel is securely grasped but not damaged.

Figure 7:
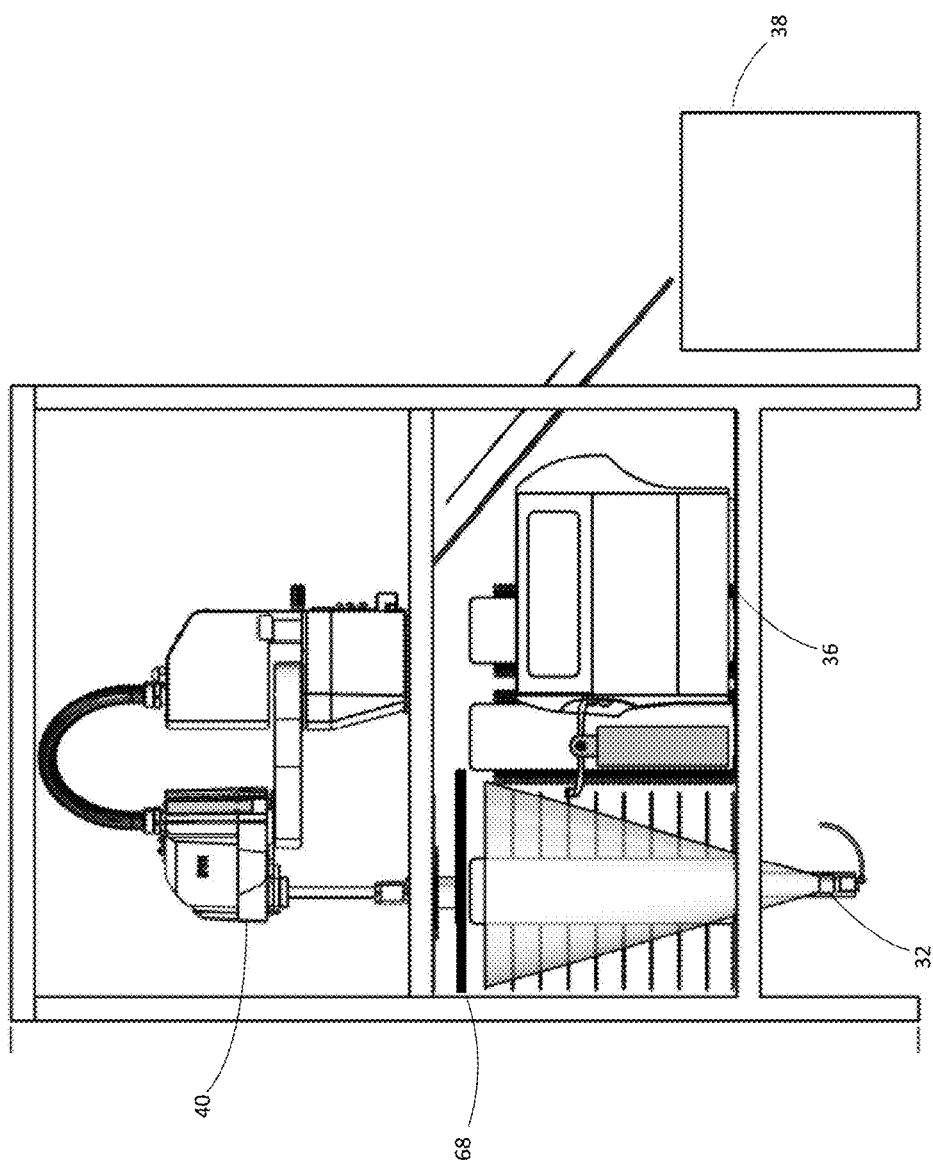
FIG. 7 is an illustration of a label sensor gathering electrical component information from a grasped reel.

FIG. 7 is a side view of the device 28 shown in FIG. 6. FIG. 7 illustrates an automated robotic manipulator 40 that has grasped a reel 68 having an exposed label. The exposed label is on an underside of the reel 68, and the grasped reel 68 is moved over the label sensor 32. The label sensor 32 gathers electrical component information from the exposed label of the reel 68. FIG. 7 is preferred as the label on the grasped reel 68 is already exposed and downward facing. So the reel 68 can be moved from a stack of reels to over the label sensor 32 without being flipped, set down and regrasped, or otherwise substantially repositioned. Further shown in FIG. 7 is a label generator 36 and output receptacle 38. The label sensor 32, label generator 36, and output receptacle 38 are adjacent to decrease the device's size and increase the device's accuracy.

Figure 8:
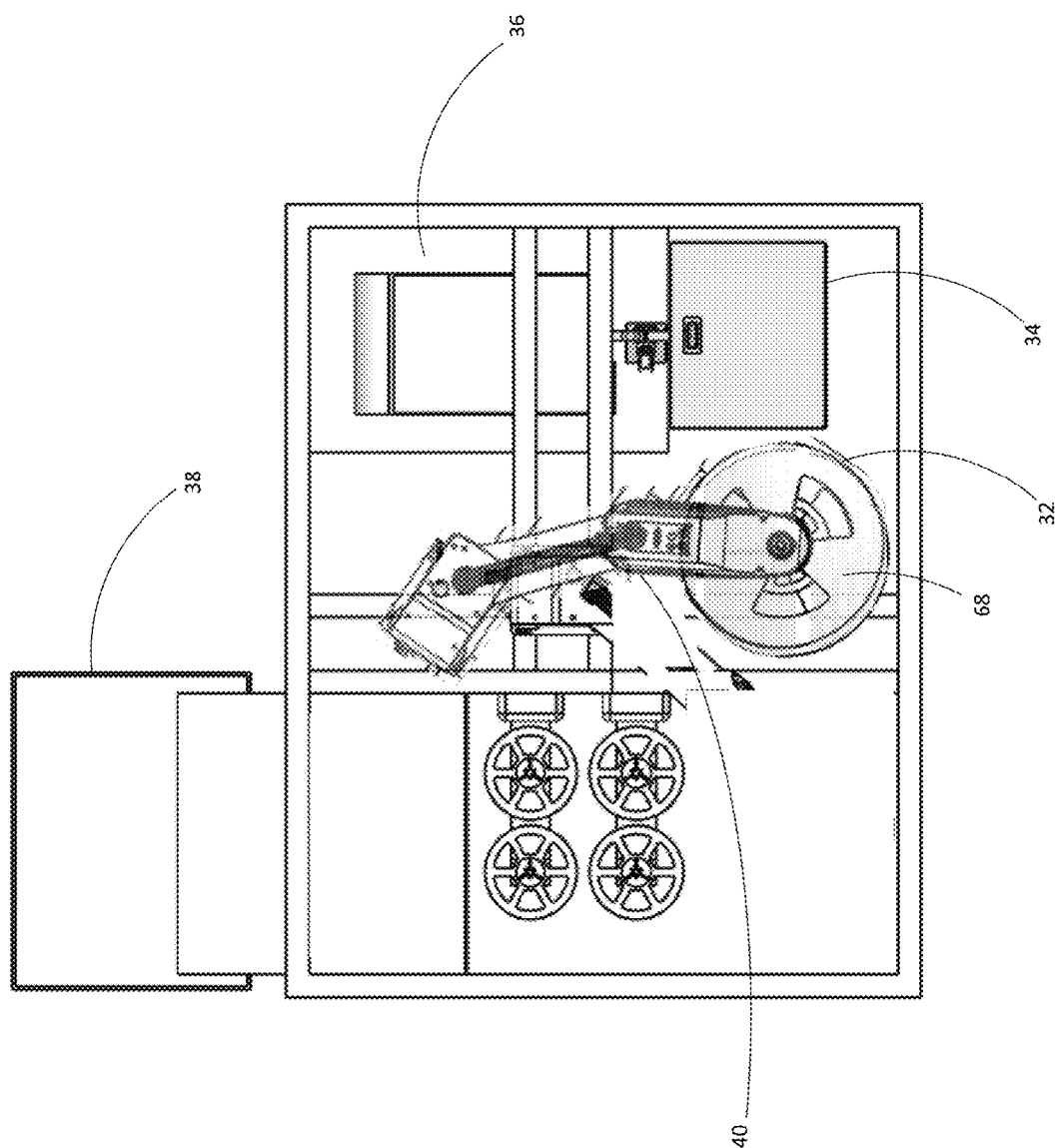
FIG. 8 is an illustration of an automated robotic manipulator moving a grasped reel across a label sensor.

FIG. 8 illustrates the automated robotic manipulator 40 moving the grasped reel 68 across a label sensor 32. The label sensor 32 gathers electrical component information from the grasped reel 68. A manipulator controller and manipulator sensor may further be included in the device 28 of FIG. 8. The manipulator controller may use information gathered by the manipulator sensor to rotate, raise, or lower the grasped reel 68 so that the label sensor 32 can gather the electrical component information. The automated robotic manipulator 40 generally does not move the grasped reel 68 past the label sensor 32 until the controller connecting the label sensor 32 and the manipulator 40 determines that the label sensor 32 has gathered the electrical component information from the grasped reel 68.

After the label sensor 32 gathers the electrical component information, the information is preferably sent to a database or MES where a new labeled is determined as a function of the gathered information.

The information to be contained on the new label is transmitted from the database or MES to the label generator 36. The label generator 36 then generates a new label that includes the new information. The label generator 36 in FIG. 8 is a printer. Preferably the new label contains one side with information and one side containing an adhesive.

After the label generator 36 generates the new label, the new label is positioned on the label actuator 34. In FIG. 8, the label generator 36 and the label actuator 34 are adjacent so that the label generator 36 is able to output the new label directly on the label actuator 34 in a predetermined location. The label in FIG. 8 is outputted with the adhesive side exposed so that the label actuator 34 is able to affix the label on the grasped reel 68. In some applications, the label generator 36 and label actuator 34 may be combined in one device, such as where the label is generated and applied by a laser-etching device.

Figure 9:
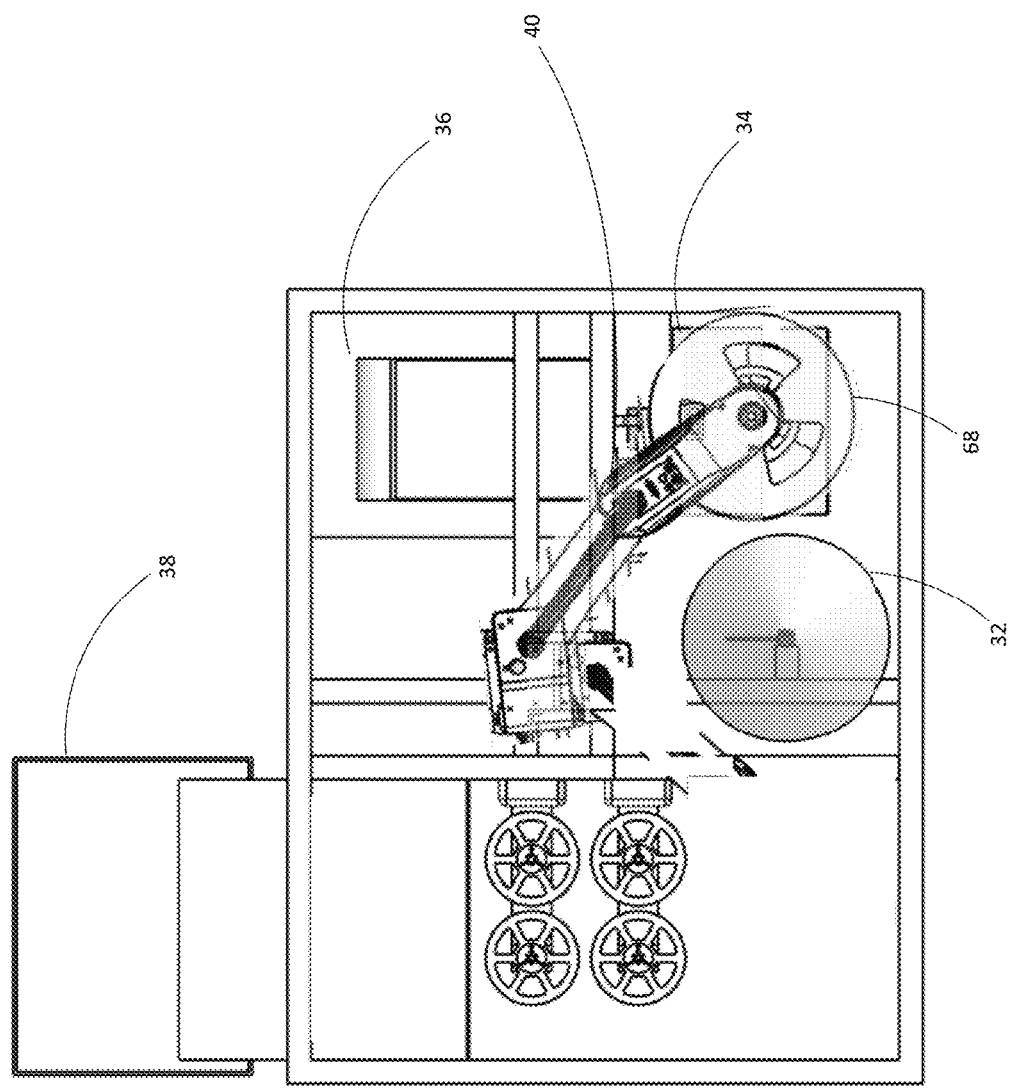
FIG. 9 is an illustration of a label actuator affixing a new label to the reel as the reel remains held by the manipulator.

FIG. 9 is an illustration of a label actuator 34 affixing a label to a reel 68 while the reel 68 is grasped by an automated robotic manipulator 40. The label actuator 34 must affix the reel 68 with sufficient force such that the new label remains affixed. But the label actuator 34 must not employ so much force that the grasped reel 68 is damaged. The manipulator 40 generally does not move the grasped reel 68 past the label actuator 34 until the controller connecting the label actuator 34 and the manipulator 40 determines that the label actuator 34 has affixed the new label. It is preferred that the reel 68 remains grasped by the automated robotic manipulator 40 throughout the method until after the new label is affixed.

Figure 10:
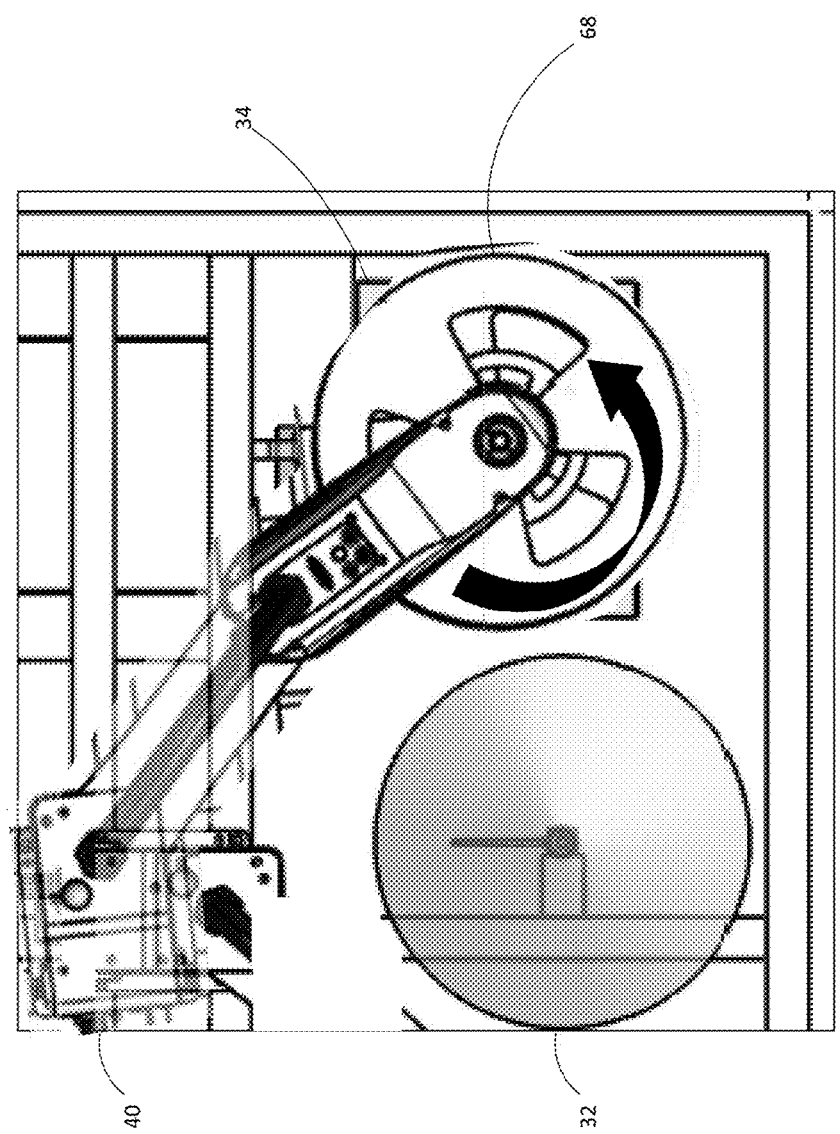
FIG. 10 is an illustration of an automated robotic manipulator positioning a reel such that a new label will be affixed in a predetermined location on the reel.

FIG. 10 is an overhead view of part of the device 28 shown in FIG. 9. In FIG. 10, the automated robotic manipulator 40 is connected to a controller and manipulator sensor so that the manipulator work piece 54 is able to rotate, raise, or lower the grasped reel 68. Because of this, the label actuator 34 in this device 28 can affix the new label in a predetermined location.

Specifically in FIG. 10, an automated robotic manipulator 40 rotates a grasped reel 68 such that a new label will be affixed by a label actuator 34 in a predetermined location on the reel 68. Further shown is a label sensor 32, which gathered information used to generate the new label. In this device, an operator sets the predetermined location. Typically, the predetermined location is inputted into the controller which directs the manipulator 40. As an example, it may be determined that the new label is to cover the original label such that information on the original label is inaccessible. Or it may be determined that the new label is to be spaced apart from the original label such that information on the original label remains accessible along with information on the new label.

Figure 11:
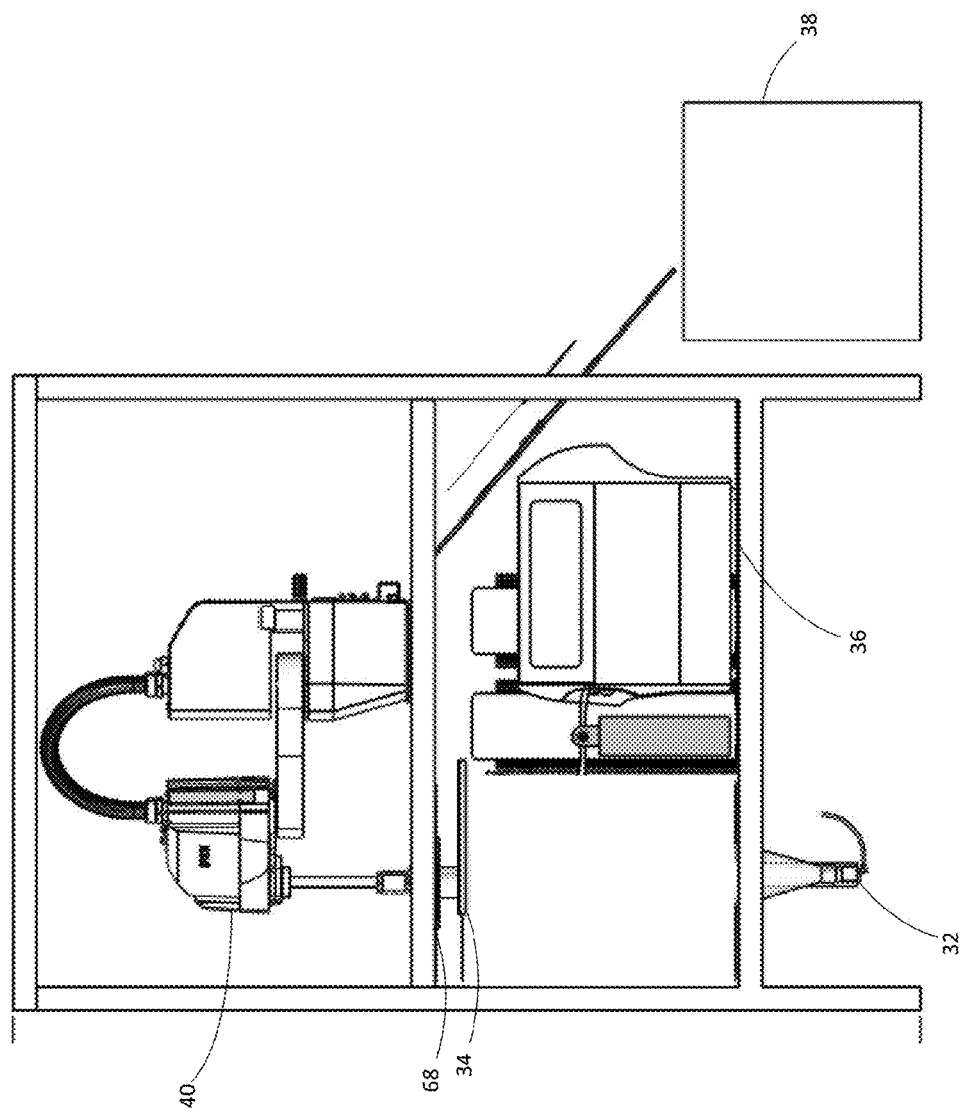
FIG. 11 is a side-view illustration of a label actuator affixing a label to a reel.

FIG. 11 is a side view of the device 28 of FIG. 9. In FIG. 11, a label actuator 34 affixes a new label to a reel 68 as the reel 68 remains held by an automated robotic manipulator 40. In FIG. 9, the label actuator 34 is a pneumatic lift. As such, the label actuator 34 of FIG. 9 lifts the generated label from the point where it received the generated label to the gripped reel as the reel is above the actuator. Further shown in FIG. 11 are these additional stations: a label sensor 32, label generator 36, and output receptacle 38. The stations of FIG. 11 are adjacent to increase the device's speed and accuracy.

Figure 12:
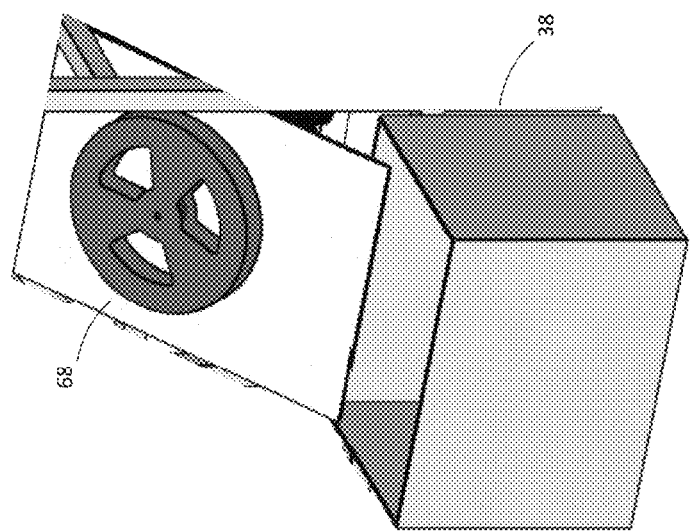
FIG. 12 is an illustration of a labeled reel entering an output receptacle.

FIG. 12 shows a labeled reel 68 entering an output receptacle 38. In this device 28, the reel 68 has been affixed with a new label and released by the automatic robotic manipulator. The reel's label or labels are face down. This is because it is preferred that the device 28 is constructed such that the manipulator 40 moves over each of the device's stations and the manipulator 40 does not flip the reel 68 before releasing. Preferably, system is outfitted with a sensor and controller attached to the output receptacle to shut off the device 28 if the output receptacle 38 is full. The output receptacle 38 may be a vertically extending rod that can receive reels from the manipulator 40. The output receptacle 38 may also be an operator who manually removes the labeled reels from the manipulator 40.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of labeling a reel of electrical components, the method comprising:
    grasping a reel having an exposed label indicating information about electrical components carried on the reel, the exposed label residing on an underside of the reel;
    moving the grasped reel across a label sensor to gather the indicated electrical component information;
    generating a new label indicating information determined as a function of gathered information; and,
    while the reel remains grasped, affixing the new label to the underside of the reel while the underside of the reel is facing down.

2. The method of claim 1, comprising, prior to affixing the new label, positioning the reel such that the new label will be affixed in a predetermined location on the reel.

3. The method of claim 2, wherein positioning the reel comprises rotating the reel.

4. The method of claim 3, wherein the new label is affixed over the exposed label, covering the information about the electrical components carrier on the reel.

5. The method of claim 1, wherein the moving comprises moving, with the underside of the reel facing down, the grasped reel over the label sensor.

6. The method of claim 1, wherein the reel remains grasped until after the new label is affixed.

7. The method of claim 1, comprising, after affixing the new label, placing the reel into or onto a reel output receptacle.

8. The method of claim 1, wherein the reel is grasped from a stack of reels.

9. The method of claim 1, wherein the new label indicating information comprises at least one element selected from the group consisting of: part number, quantity, manufacturer information, lot code, and date code.

10. The method of claim 1, wherein the new label indicating information comprises a unique reel identifier.

11. The method of claim 1, wherein the indicating information of the exposed label and new label is carried on bar codes.

12. A system for labeling a reel of electrical components, the system comprising:
    an automated robotic manipulator movable between a reel grasping position and a reel releasing position;
    a sensor positioned to scan a label residing on an underside of a reel as the reel is moved by the automated robotic manipulator from the reel grasping position to the reel releasing position, to gather initial reel information;
    a label generator configured to generate a new label with indicating information based at least in part on the initial reel information; and
    a label actuator positioned to affix the new label to the underside of the reel as the reel remains held by the automated robotic manipulator with the underside of the reel facing down.

13. The system of claim 12, wherein the sensor is a barcode scanner.

14. The system of claim 12, wherein the label generator is a label printer.

15. The system of claim 12, wherein the label actuator is a pneumatic actuator, and wherein the automated robotic manipulator is configured to position the reel over the pneumatic actuator to allow the pneumatic actuator to affix the new label on the underside of the reel while the reel is facing down.

16. The system of claim 12, wherein the new label comprises a unique reel identifier.

17. The system of claim 12, wherein the initial reel information and new label indicating information are carried on bar codes.

18. The system of claim 12 comprising, a stack of reels to be labeled.

19. The system of claim 12 comprising, an output receptacle to receive the reel from the automated robotic manipulator after the new label is affixed to the reel.

20. The method of claim 2, wherein the positioning comprises moving, by an automated robotic manipulator, the reel with respect to a label actuator, and then positioning, by the automated robotic manipulator, the reel over the label actuator with the underside of the reel facing the label actuator.

21. The method of claim 20, wherein the grasping and moving steps comprise grasping, by the automated robotic manipulator, the reel while the underside of the reel is facing down, and moving, by the automated robotic manipulator, the reel over the sensor while the underside of the reel is facing down.

22. The method of claim 9, wherein the exposed label comprises a manufacturer's label, and the new label comprises information for inventory management.

\* \* \* \* \*